(12) United States Patent
Ota et al.

(10) Patent No.: US 7,744,983 B2
(45) Date of Patent: Jun. 29, 2010

(54) LAMINATED STRUCTURE AND METHOD FOR MANUFACTURING THE SAME

(75) Inventors: Tetsuyuki Ota, Kanagawa-ken (JP); Masahiko Hara, Kanagawa-ken (JP); Tatsushi Ohno, Kanagawa-ken (JP); Hiroyuki Aizawa, Kanagawa-ken (JP); Kiyohiko Obara, Kanagawa-ken (JP)

(73) Assignee: Kasai Kogyo Co., Ltd., Kanagawa-ken (JP)

( * ) Notice: Subject to any disclaimer, the term of this patent is extended or adjusted under 35 U.S.C. 154(b) by 905 days.

(21) Appl. No.: 10/229,211

(22) Filed: Aug. 28, 2002

(65) Prior Publication Data
US 2004/0043187 A1    Mar. 4, 2004

(51) Int. Cl.
*B32B 3/00* (2006.01)
*B60J 10/00* (2006.01)
*B60R 13/02* (2006.01)

(52) U.S. Cl. .................... 428/192; 428/172; 428/318.8; 296/146.7

(58) Field of Classification Search ................ 428/157, 428/158, 172, 192, 318.8, 14; 296/146.7
See application file for complete search history.

(56) References Cited

U.S. PATENT DOCUMENTS

| | | | | |
|---|---|---|---|---|
| 3,594,262 A * | 7/1971 | Magidson | .................... | 442/38 |
| 3,807,146 A * | 4/1974 | Witkowski | .................... | 55/357 |
| 3,989,275 A * | 11/1976 | Finch et al. | .................... | 280/751 |
| 4,743,323 A * | 5/1988 | Hettinga | ...................... | 156/160 |
| 5,082,310 A * | 1/1992 | Bauer | .......................... | 280/732 |
| 5,222,760 A * | 6/1993 | Rafferty | ................... | 280/728.3 |
| 5,681,652 A * | 10/1997 | Cope | ......................... | 428/318.8 |
| 5,693,423 A * | 12/1997 | Laura et al. | .................. | 428/413 |
| 5,776,509 A * | 7/1998 | Ota et al. | ..................... | 425/111 |
| 5,788,332 A | 8/1998 | Hettinga | | |
| 5,795,013 A * | 8/1998 | Keller et al. | ............ | 296/187.05 |
| 5,900,300 A * | 5/1999 | Slaven | .......................... | 428/71 |
| 5,951,094 A * | 9/1999 | Konishi et al. | ............... | 296/153 |
| 5,951,802 A * | 9/1999 | Deeks | ......................... | 156/214 |
| 6,164,686 A * | 12/2000 | Rupp | ...................... | 280/728.3 |
| 6,203,056 B1 * | 3/2001 | Labrie et al. | ............. | 280/728.3 |

FOREIGN PATENT DOCUMENTS

| | | |
|---|---|---|
| EP | 0 361 740 | 4/1990 |
| EP | 0 734 832 A2 | 10/1996 |
| EP | 1 052 076 A1 | 11/2000 |
| EP | 1 216 808 A1 | 12/2001 |
| JP | 04-163010 | 8/1992 |
| JP | 6-315994 | 11/1994 |
| JP | 07-025290 | 1/1995 |
| JP | 08-229977 | 9/1996 |
| JP | 08-281704 | 10/1996 |

(Continued)

*Primary Examiner*—Donald Loney
(74) *Attorney, Agent, or Firm*—Dickstein Shapiro LLP

(57) ABSTRACT

The laminated structure includes a lightweight and shape-retaining foamed resin base member, an outer circumference frame integrally laminated on the reverse side of the foamed resin base member along the outer circumference of an article, and bridging ribs connecting between respective points on the outer circumference frame. Accordingly, the present invention provides a lightweight laminated structure with low cost by reducing the amount of the resin used, since the molded synthetic resin outer circumference frame and bridging ribs have small projection areas.

15 Claims, 10 Drawing Sheets

| | FOREIGN PATENT DOCUMENTS | | |
|---|---|---|---|
| JP | 09-048301 | 2/1997 | |
| JP | 09-051594 | 2/1997 | |
| JP | 10-129378 | 5/1998 | |
| JP | 10-226284 | 8/1998 | |
| JP | 11-333880 | 7/1999 | |
| JP | 2000-355254 | 12/2000 | |
| JP | 2001-026246 | 1/2001 | |
| JP | 2001-121561 | 8/2001 | |

\* cited by examiner (a)

(b)

LAMINATED STRUCTURE AND METHOD FOR MANUFACTURING THE SAME

BACKGROUND OF THE INVENTION

1. Field of the Invention

The present invention relates to a laminated structure and a method for manufacturing the laminated structure, which is favorably used for automobile interior parts such as a door trim, rear side trim and luggage trim and other interior parts of vehicles, as well as for building materials, wall materials and interior panel in buildings and houses.

2. Description of the Related Art

The construction of the interior parts of an automobile will be described using the door trim as an example with reference to FIGS. 19 and 20.

The door trim 1 is composed of an integrated laminate comprising a surface skin layer 3 having an excellent surface appearance on the surface of a shape-retaining resin core material 2 having rigidity enough for mounting on a chassis.

A polypropylene based resin mixed with talc is used for the resin core material 2. A synthetic resin sheet such as a polyvinyl chloride sheet is used for the surface skin 3 that has intrinsically no shape-retaining property, and elastomer sheets such as TPO (thermoplastic olefin) sheet has been frequently used for the surface skin in recent years considering the effect on the environment and availability for recycling.

A conventional method for molding the door trim 1 will be described hereinafter with reference to FIG. 21. The main parts of the die assembly 4 for molding the door trim 1 comprises an upper die 5 capable of ascending and descending with a predetermined stroke, a stationary lower die 6 paired with the upper die 5, and an injector 7 communicating with the lower die 6.

A cavity 5a for molding the final shape of the door trim 1 is formed in the upper die 5 by closing the upper and lower dies 5 and 6, and a core 6a is provided in the lower die 6. A hoist cylinder 5b is connected to the upper die 5 for ascending and descending movement of the upper die with a predetermined stroke, and a manifold 6b and gate 6c provided at the lower die 6 serve as passageways of a molten resin from the injector 7.

Guide posts 6d are provided at four corners of the lower die 6 for maintaining a proper position of the ascending and descending upper die 5, and guide bushes 5c corresponding to respective guide posts 6d are provided in the upper die 5.

Accordingly, the surface skin 3 is set in the die assembly while the upper and lower dies 5 and 6 are open, and a molten resin M is injected into a cavity between the die assembly from the injector 7 through the manifold 6b and gate 6c after closing the upper and lower dies 5 and 6 with each other, thereby the resin core material 2 is formed into a desired curved shape to integrally mold the surface skin 3 onto the resin core material 2.

While the molten resin M is fed on the molding surface of the core part 6a with the die assembly open in FIG. 21 for the convenience of descriptions, the molded resin M is actually injected into the cavity after closing the upper and lower molds 5 and 6 each other.

However, it has been pointed out in the conventional door trim 1 that the material cost becomes high due to a large projection area of the resin core material 2 with a large weight of the article.

The injection pressure for molding is forced to be high due to the large projection area of the resin core material 2. As a result, the die assembly become expensive since a die structure durable to the high injection pressure is required in addition to a long period of molding cycles for cooling and solidifying a large quantity of the molten resin.

Furthermore, the surface skin 3 becomes poor in sound absorbing ability since an air-impermeable synthetic resin sheet is used as a base, making it impossible to expect the sheet to have a sound absorbing property against the noises generated in the cabin.

SUMMARY OF THE INVENTION

Accordingly, it is an object of the present invention considering the situations as hitherto described to provide a laminated structure capable of accelerating to be lightweight and high rigidity while decreasing the manufacturing cost, and a method for manufacturing the laminated structure, whereby the cost for forming the die assembly can be reduced and the molding cycle can be shortened while being excellent in sound absorbing ability and being advantageous in safety, environment and recycling aspects.

The inventors of the present invention have completed, through intensive studies, the present invention by endowing foamed resin sheets that have been used as surface skin materials with a shape-retaining property to function as core materials, and by disposing molded synthetic resins at the portions that require higher rigidity, or at peripheral portions of the article or at a panel, or at the portions for attaching each component. In this point, JP2001-121561A discloses a thermoplastic resin molded article wherein a functional member, which is such as a hook, boss and clip, partially made of a thermoplastic resin is fused or bonded to a thermoplastic resin foamed sheet in order to secure the homogeneity of resistance of the functional member to the drawing strength when drawn from the thermoplastic resin foamed sheet. Therefore, as described below, the characteristic of a functional member according to the present invention differs from that of JP2001-121561A.

In one aspect, the present invention provides a laminated structure comprising a shape-retaining foamed resin base member and an outer circumference frame comprising a molded synthetic resin assembly integrally laminated on the reverse side of the foamed resin base member so as to confirm the outer circumference shape of an article.

The laminated structure as used herein may be applied to automobile interior parts such as a door trim, rear package tray, floor trim, luggage trim, trunk trim and rear side trim, interior panels used for interior parts of vehicles other than automobiles, as well as to wall materials and interior panels in buildings and houses.

A shape-retaining foamed resin base member may be formed into a desired shape by omitting a heat-softening step when molded articles are almost in flat shape. In forming an article with a three-dimensional shape, however, the foamed resin sheet is formed into a shape having desired curved surfaces in a die after softening by a heat-treatment in order to retain the shape. When the article includes a portion that should be widely expanded, on the other hand, an evacuation mechanism is connected to the die assembly, and the foamed resin sheet may be made to conform to the inner face of the die assembly by applying a negative pressure after softening the foamed resin sheet by a heat-treatment.

The foamed resin sheet is prepared using a material comprising a foaming agent added into a thermoplastic resin. The thermoplastic resin may comprise one kind or plural kinds of thermoplastic resins preferably including, for example, a polyethylene based resin, a polypropylene based resin, a polystyrene based resin, a polyethylene terephthalate based resin, a polyvinyl alcohol based resin, a polyvinyl chloride based resin, an ionomer based resin and an acrylonitrile/butadiene/styrene (ABS) resin.

Examples of the foaming agents available include organic foaming agents such as an azo compound, a sulfohydrazide compound, a nitroso compound and an azide compound, or inorganic foaming agents such as sodium bicarbonate.

The foamed resin base member obtained by forming into a predetermined shape after softening the foamed resin sheet by a heat treatment preferably has 2 to 10 times of forming ratio considering a balance between the weight and strength of the article. The cell diameter of the foamed resin base member is preferably in the range of 0.1 μm to 2 mm, and the thickness of the foamed resin base member is in the range of 0.5 to 30 mm, preferably in the range of 1 to 10 mm.

Materials of the thermoplastic resins to be used for the outer circumference frame may be appropriately selected from a wide range of thermoplastic resins. Preferably used thermoplastic resins include a polyethylene based resin, polypropylene based resin, polystyrene based resin, polyethylene terephthalate based resin, polyvinyl alcohol based resin, polyvinyl chloride based resin, ionomer based resin, polyamide based resin, acrylonitrile/butadiene/styrene based (ABS) resin and polycarbonate resin.

Various fillers may be mixed in the thermoplastic resin. The fillers available include inorganic fibers such as a glass fiber and carbon fiber, and inorganic particles such as talc, clay, silica and calcium carbonate particles. Various additives such as antioxidant, UV absorber, colorant, flame retardant and low shrinkage agent may be also blended.

The shape-retaining foamed resin base member may be wound along the peripheral lines of the outer circumference frame of an article. Otherwise, the foamed resin base member may be cut together with the outer circumference frame so as to expose the cut cross section, when the foamed resin base member is formed behind an opposed member.

The laminated structure according to the present invention comprises a shape-retaining foamed resin base member and an outer circumference frame comprising a molded synthetic resin that is integrally laminated on the reverse side of the foamed resin base member along the peripheral edge of the article. Conventionally used resin cores may be omitted by endowing the foamed resin base member with a core material function, and by providing the outer circumference frame made of the molded synthetic resin at the periphery of the article that is required to be more rigid. The article may be accordingly lightweight by omitting the conventional resin core having a quite broad projection area while saving the quantity of the resin material used to enable the material cost to be decreased.

The laminated structure becomes excellent in sound absorbing ability due to a sound absorbing porous structure of the foamed resin base member. In addition, recycling process may be simplified by using the polyolefin based resin as a starting material of the foamed resin base member and outer circumference frame, since separation processes may be omitted by using only the olefin based resin.

While the outer circumference frame may be flat in another aspect of the present invention, it is preferable to form the cross section thereof into a rigid L-shape for retaining the shape of the article for a long period of time.

Bridging ribs that are vertically and horizontally extended may be provided between respective points on the outer circumference frame. The bridging ribs may be integrally molded with each other when the outer circumference frame is molded in the die assembly. In particular, no stripes are exposed on the surface of the article with good external appearance and good shape retaining ability by employing the ribs having a L-shaped cross section or a reversed T-shaped cross section so that flat portions thereof contact the reverse side of the foamed resin base member.

The thickness of the bridging rib may be properly varied in such a manner that the ribs are formed with a large thickness at the portions of the article where a large external force is applied, and the ribs are formed with a small thickness at the portions of the article where the external force is scarcely applied. Accordingly, a minimum essential quantity of the resin material may be used for making the article lightweight or for reducing the production cost of the article.

Mounting seats for mounting clip seats or various escushion seats may be integrally molded with the outer circumference frame or bridging ribs. Alternatively, a surface skin for enhancing external appearance and design may be laminated on the surface of the foamed resin base member. Materials available for the surface skin include woven fabrics, nonwoven fabrics, knit fabrics, sheets, films, formed bodies and nets. Although the materials comprising the surface skin are not particularly restricted, use of air permeating materials such as woven fabrics, nonwoven fabrics and knit fabrics is preferable for utilizing sound absorbing ability of the foamed resin base member.

Preferably, the laminated structure according to the present invention comprises the laminated structure so constructed as hitherto described, and a molded synthetic resin assembly attached to the laminated structure so as to be integrally molded with the outer circumference frame of the laminated structure.

The laminated structure may be applied to a two-tone type door trim having a different appearance between the upper part and the lower part of the article. For example, the upper door trim comprises a laminated structure of molded synthetic resin assembly such as a shape-retaining formed resin base prepared by molding a foamed resin sheet on the reverse side of the article, an outer circumference frame on the reverse side of the foamed resin base member, and bridging ribs connecting between respective points on the outer circumference frame, if necessary. The lower door trim comprises a monolithic molded synthetic resin formed into a panel of the synthetic resin.

Accordingly, the laminated structure such as the upper door trim has much to do with lightweight of the structure as compared with the conventional laminated structure by permitting the foamed resin base member to have a core function, in addition to reducing the production cost due to a small quantity of resins used.

In another aspect, the present invention provides a method for manufacturing a laminated structure comprising a shape-retaining foamed resin base member, an outer circumference frame integrally laminated on the reverse side of the foamed resin base member and a bridging rib. In a first step, a foamed resin sheet as a starting material of the foamed resin base member is set in a die assembly. Then, the foamed resin sheet is allowed to conform the shape of the cavity in the die assembly by closing the die assembly with each other to mold the foamed resin base member into a predetermined shape. Subsequently, the outer circumference frame and bridging rib are integrally laminated on the reverse side of the foamed resin base member by injecting a molten resin into the cavity in the die assembly.

The die assembly as used herein comprises an upper die capable of ascending and descending, a lower die positioned under the upper die, and an injector in communication with the lower die. A molten resin fed from the injector is supplied onto the molding face of the lower die through resin passageways such as a manifold and gate provided in the lower die.

The molten resin is injected into a cavity in the die assembly with a given injection pressure after the upper die has descended onto a lower dead point and the upper and lower dies have been closed each other.

The foamed resin sheet is molded following the surface shape of the die assembly by closing the upper and lower dies with each other, and the outer circumference frame and bridging ribs are formed by injecting a molten resin into the cavity of the die assembly. Consequently, the outer circumference frame and bridging ribs are integrally laminated on the reverse side of the foamed resin base member.

The molten resin may be injected through the manifold and gate at a timing before the upper die reaches the lower dead point in a different aspect of the present invention. The molten resin is evenly distributed in the cavity by a compression pressure of the upper die generated by closing in order to form the outer circumference frame and bridging ribs.

When the article is designed to give a three-dimensional shape, on the other hand, the foamed resin sheet is set in the die assembly after softening the resin by heating with a heater.

Then, the foamed resin sheet after softening by a heat-treatment is placed in the die assembly followed by closing the die assembly, thereby obtaining a shape-retaining foamed resin base member.

The outer circumference frame and bridging ribs may be integrally laminated on the reverse side of the shape retaining and lightweight foamed resin. When the final article is required to have a widely extended shape, on the other hand, the die assembly is closed several times with injection of the molten resin at the final closing step.

An evacuation mechanism may be connected to the upper mold to allow the foamed resin base member to be molded along the surface of the upper mold by a negative pressure generated by evacuation, when widely extended portions are included in the shape of the article.

The die assembly suffer little load in the method according to the present invention as compared with the conventional method using a resin core having a wide projection area, since only the outer circumference frame and bridging ribs are molded in the present invention. This process consumes a small amount of resins that is beneficial for reducing the material cost. Furthermore, the molding cycle of the article may be shortened by reducing the cooling time as compared with the conventional one.

In a different aspect, the present invention provides a method for manufacturing a two-tone type laminated structure. In a first step, the foamed resin sheet as a starting material of the foamed resin base member is set at a predetermined position between the die assembly. Then, the foamed resin sheet is allowed to conform the shape of the cavity of the die assembly by closing the die assembly with each other to form the foamed resin base member into a predetermined shape. Subsequently, a molten resin is fed on the reverse side of the foamed resin base member from a first injector through a resin passageway before closing the die assembly in order to integrally laminate the outer circumference frame and the bridging rib connecting respective point on the outer circumference frame on the reverse side of the foamed resin to mold the laminated structure. Finally, another molten resin is injected into a cavity, which is formed in the area where the foamed resin base member has not been set, from the second injector through a resin passageway in order to integrally mold the molded synthetic resin with the laminated structure.

While the heating step may be omitted in the method described above when the article has a relatively flat shape, the foamed resin sheet may be set in a necessary part of the die assembly after the softening the resin sheet by a heat-treatment when the article has a three dimensional shape.

In a different aspect of the method described above, the molten resin for the outer circumference frame and bridging ribs is fed from one injector through a common resin passageway and branched passageways, followed by injecting the molten resin for the molded synthetic resin through the common resin passageway and branched resin passageways using the same injector.

Consequently, the manufacturing steps may be reduced by molding the two-tone type laminated structure in one step. The cost for equipment may be also reduced by applying a single cylinder type injector in place of a dual cylinder type injector.

DESCRIPTION OF THE PREFERRED EMBODIMENTS

Favorable embodiments of the laminated structure according to the present invention and methods for manufacturing the same will be described hereinafter with reference to automobile door trims and methods for manufacturing the same.

Figure 1:
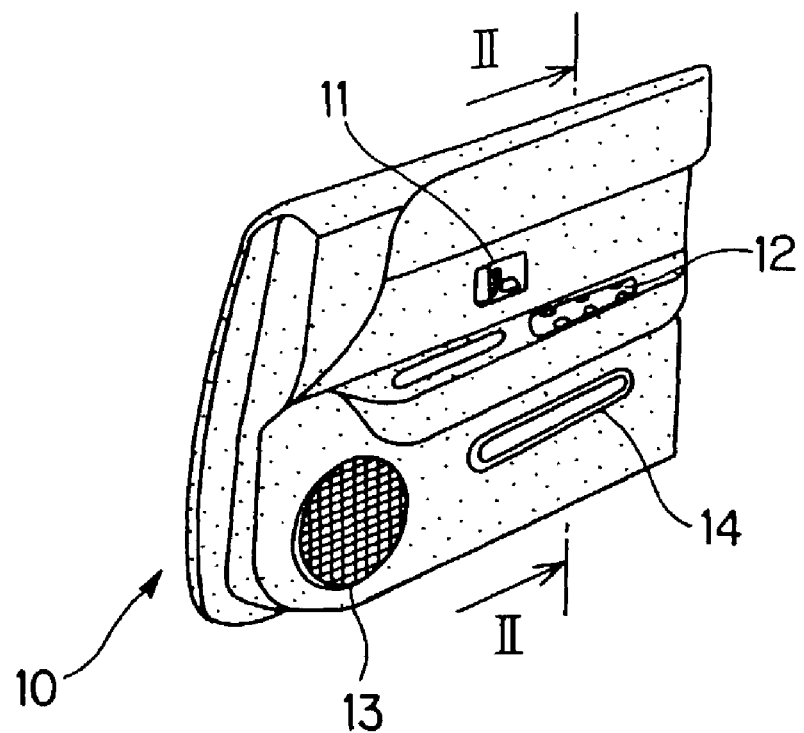
FIG. 1 shows a perspective view of the door trim according to the first aspect of the present invention.
Figure 2:
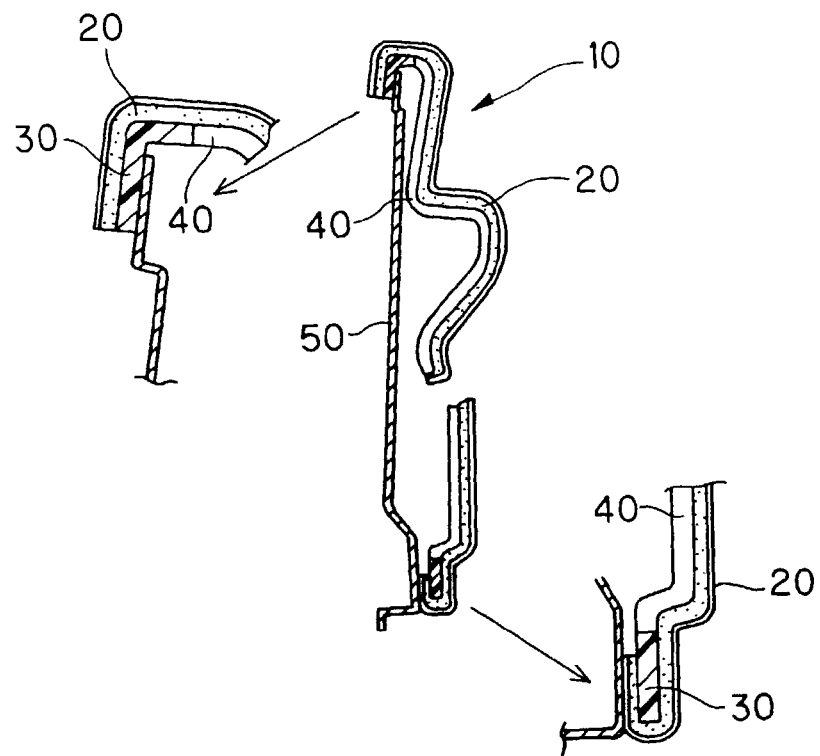
FIG. 2 shows a cross section along the line II-II in FIG. 1.
Figure 3:
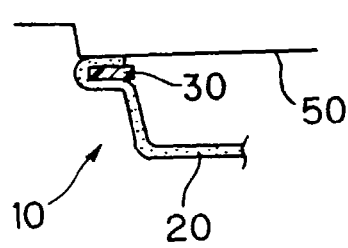
FIG. 3 illustrates the junction between the peripheral part of the article and the chassis panel in the door trim shown in FIG. 1.
Figure 3:
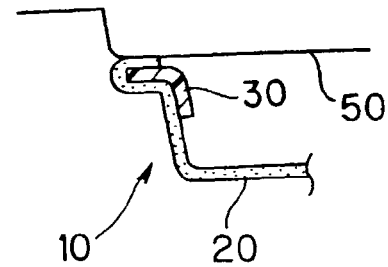

FIGS. 1 to 12 show the first embodiment of the present invention, wherein FIG. 1 shows an external appearance of the door trim as an application of the laminated structure according to the first embodiment of the present invention, FIG. 2 is a cross section showing the construction of the door trim, and FIG. 3 is a cross section showing the peripheral edge of the door trim.

Figure 4:
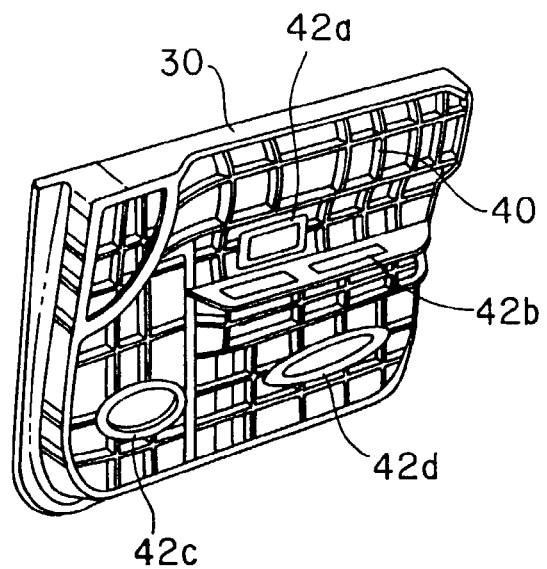
FIG. 4 shows a modification of the door trim shown in FIG. 1 from which the foamed resin base member is removed.
Figure 5:
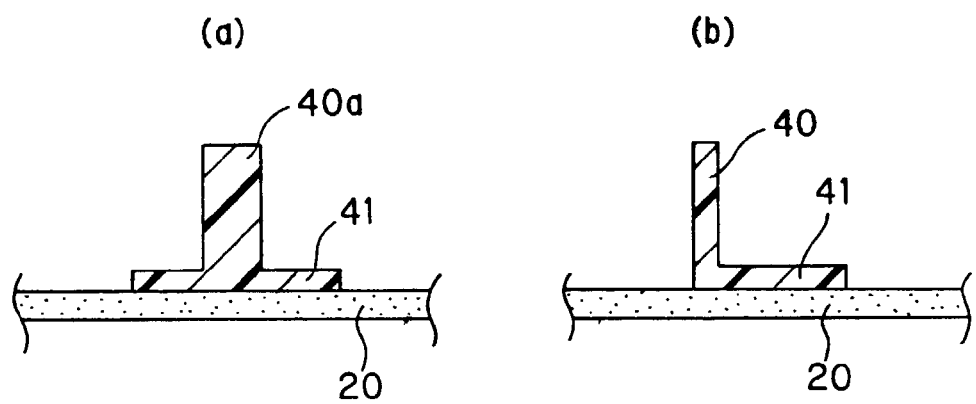
FIG. 5 is a cross section showing the junction between the bridging rib and foamed resin base member in the door trim shown in FIG. 4.
Figure 6:
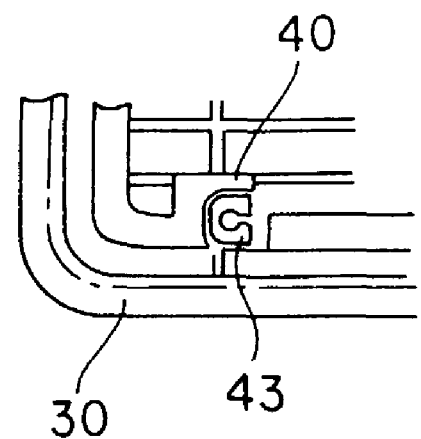
FIG. 6 shows a bottom view viewed from the reverse side of the door trim for indicating the clip seat integrally laminated with the bridging rib of the door trim in the laminated structure according to the present invention.
Figure 7:
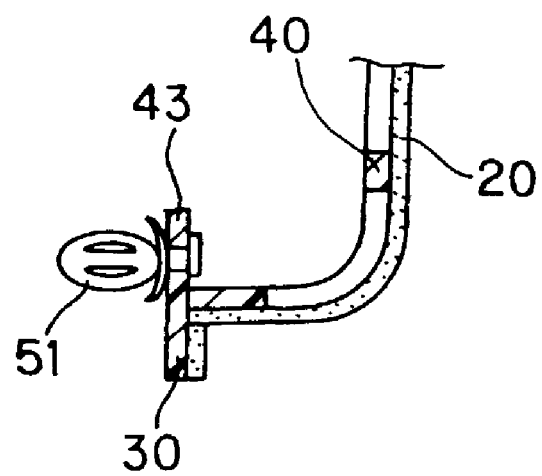
FIG. 7 is a cross section showing the structure in which the clip seat is integrally molded with the outer circumference frame of the door trim.
Figure 8:
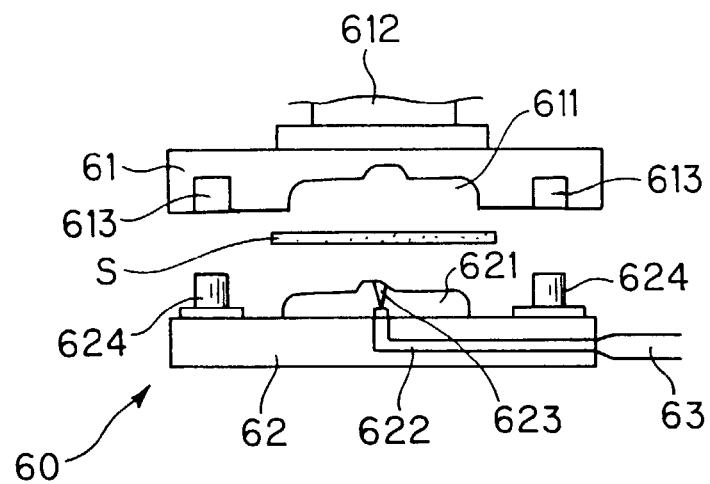
FIG. 8 illustrates a manufacturing step for setting the foamed resin sheet in the method for manufacturing the door trim shown in FIG. 1.
Figure 9:
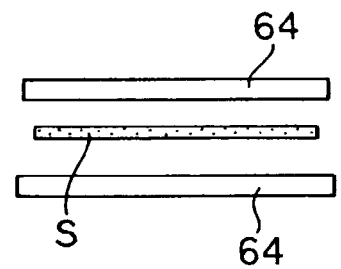
FIG. 9 illustrates a pre-heating step of the foamed resin sheet.
Figure 10:
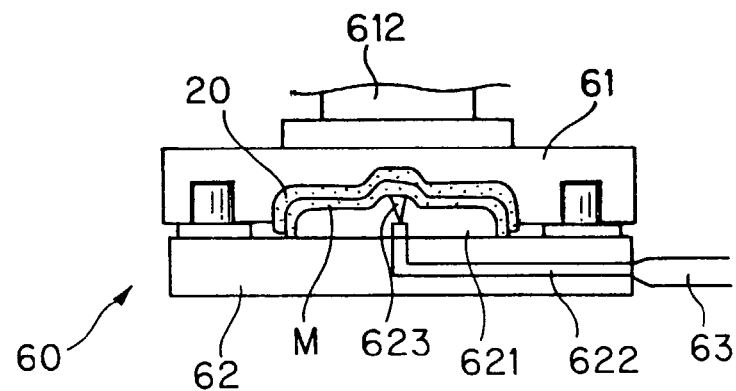
FIG. 10 illustrates the injection molding step of the door trim show in FIG. 1.
Figure 11:
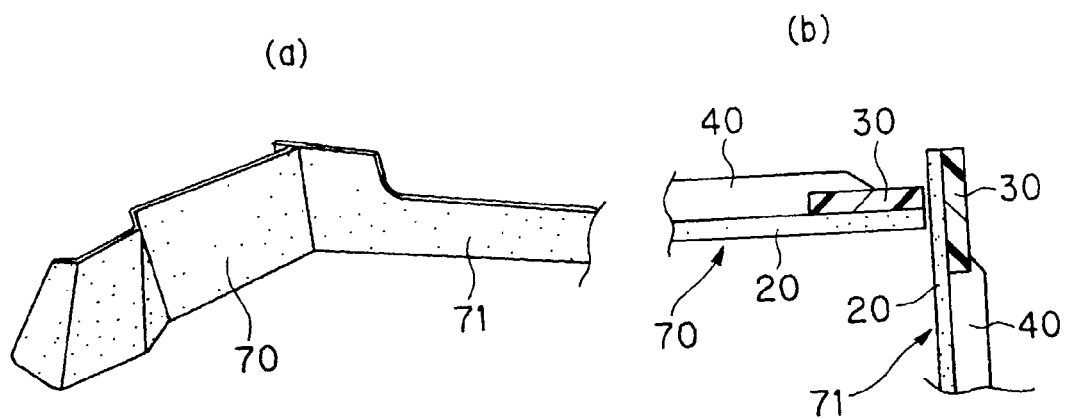
FIG. 11A shows an external appearance of the laminated structure according to the present invention when applied for a trunk side trim and trunk rear trim.
FIG. 11B shows a cross section of the junction of the laminated structure according to the present invention when applied for a trunk side trim and trunk rear trim.
Figure 12:
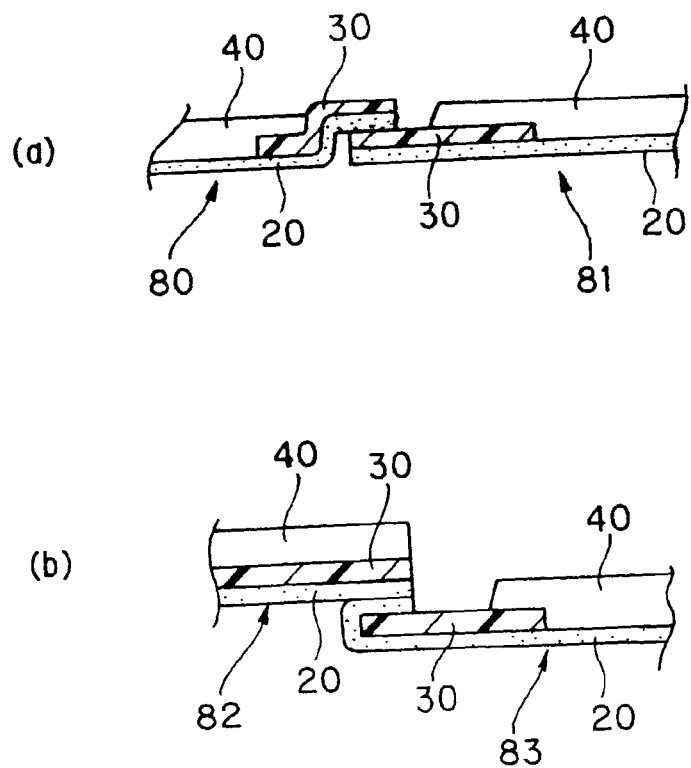
FIG. 12A shows a cross section of a joggle joint for joining between the laminated structure according to the present invention and an adjoining member.
FIG. 12B shows a cross section of a joint between planar parts of the laminated structure according to the present invention and an adjoining member.

FIG. 4 shows a modification of the door trim showing a perspective view of the outer circumference frame and bridging ribs when the foamed resin base member is removed from the door trim, FIG. 5 is a cross section showing the relation between the bridging ribs and foamed resin base member, and FIGS. 6 and 7 shows the relation between the outer circumference frame and bridging ribs, and clip seat. FIGS. 8 to 10 each shows a manufacturing step in the first embodiment when the method according to the present invention is applied for manufacturing the door trim. FIGS. 11 and 12 illustrate the joint structure between the laminated structure according to the present invention and an adjoining member.

The first embodiment of the present invention will be now described with reference to FIGS. 1 to 12.

The door trim 10 shown in FIGS. 1 and 2 mainly comprises a shape-retaining foamed resin base member 20 formed into a shape having a desired curved surface, an outer circumference frame 30 comprising a molded synthetic resin member integrally laminated along the peripheral edge of the door trim 10 at the back side of the foamed resin base member 20, and bridging ribs 40 integrally laminated on the reverse side of the foamed resin base member 20 and connecting between respective points on the outer circumference frame 30.

In more detail, a decorative surface skin may be laminated on the entire surface, or a part thereof, of the article of the foamed resin base member 20. Various resin parts such as an inside handle escussion 11, a power window switch finisher 12, a speaker grill 13 and a pocket escussion 14 may be attached to the door trim 10.

While the foamed resin base member 20 is formed into a desired shape by heating or by cold-press using dies having a desired shape after softening the foamed resin sheet by heating so that it can retain a desired shape, the portion required to be extended in a wide area may be formed by vacuum molding of the foamed resin base member. Flat shaped members such as lid members including a jack lid may be directly formed into a flat shape without applying any heat-softening treatment of the foamed resin sheet.

The foamed resin sheet comprises a conventional thermoplastic resin and a foaming agent added therein. Examples of the thermoplastic resin available include a polyethylene based resin, polypropylene based resin, polystyrene based resin, polyethylene terephthalate based resin, polyvinyl alcohol based resin, polyvinyl chloride based resin, ionomer based resin and acrylonitrile/butadiene/styrene (ABS) based resin. Examples of the foaming agent available include organic foaming agents such as azodicarboamide and inorganic foaming agents such as sodium bicarbonate. A foaming resin sheet prepared by appropriately adding sodium bicarbonate in the polypropylene based resin is used in this embodiment. The foaming ratio of the foaming resin base is set to be 2 to 10 times with a thickness in the range of 0.5 to 30 mm, in particular 1 to 10 mm.

The outer circumference frame 30 comprises a conventional resin. The preferably used resin may be appropriately selected from the polyethylene based resin, polypropylene based resin, polystyrene based resin, polyethylene terephthalate based resin, polyvinyl alcohol based resin, polyvinyl chloride based resin, ionomer based resin, polyamide based resin, acrylonitrile/butadiene/styrene (ABS) based resin and polycarbonate based resin. However, the polypropylene based resin is used in this embodiment considering the effect on the environment and availability for recycling.

A filler, for example an inorganic fiber such as glass fiber or carbon fiber, or inorganic particles such as talc, clay, silica or calcium carbonate particles may be mixed into the thermoplastic resin for forming the outer circumference frame 30.

Bridging ribs 40 are disposed between respective points on the outer circumference frame 30 as shown in FIG. 2 in order to enhance the shape retaining property of the foamed resin base member to enable a favorable shape as the door trim 10 to be maintained. The same material as used for the outer circumference frame 30 is also used for the bridging ribs 40 for integrally laminating the former with the latter.

While the outer circumference frame 30 formed to be parallel to the outer circumference of the door trim 10 may be formed into a flat shape as shown in FIG. 3A, it is preferably formed to have a L-shaped cross section as shown in FIG. 3B in order to enhance its rigidity.

The door trim 10 shown in FIGS. 1 and 2, and FIGS. 3A and 3B comprises the shape retaining foamed resin base member 20 and the outer circumference frame 30 integrally laminated to be parallel to the outer circumference of the article on the reverse side of the foamed resin base member 20. In addition, the bridging ribs 40 may be provided so as to connect between respective points on the outer circumference frame 30. Consequently, resin cores that have occupied the entire surface of the conventional articles may be omitted. Therefore, the articles may be made to be lightweight with a weight reduction of 40% or more as compared with the conventional articles by using the light foamed resin base member 20, thereby enabling the amount of the resin materials used to be largely reduced to result in a decrease of the manufacturing cost.

The door trim 10 is excellent in sound absorbing ability and reduces the noised in the cabin thanks to the porous structure of the foamed resin base member 20. The surface skin integrally laminated on the surface of the foamed resin base member 20 for maintaining the sound absorbing property of the foamed resin base member 20 is preferably made of an air permeable sheet such as woven fabrics, nonwoven fabrics or knit fabrics. However, a synthetic resin sheet, synthetic resin film, foamed material or a net may be used for the surface skin in place of the air permeable sheet such as the woven fabrics, nonwoven fabrics and knit fabrics.

The shape of the door trim 10 is retained by using the shape retaining foamed resin base member 20. Furthermore, the outer circumference frame 30 and bridging ribs 40 are disposed at the portions requiring to have improved rigidity—such as peripheral portion of the article, mounting site of other functional members and chassis panel mounting member—to ensure desired rigidity.

Accordingly, it is an advantage of the present invention to provide the lightweight door trim 10 with a low manufacturing cost. In particular, it is preferable for mounting the outer circumference frame 30 on the automobile body panel 50 so that no gap is formed between the outer circumference frame and automobile body panel 50 by using a highly rigid outer circumference frame 30.

In FIG. 4, the outer circumference frame 30 and bridging ribs 40 are exposed by removing the foamed resin base member 20. The bridging ribs 40 that vertically and horizontally extend so as to connect between respective points on the outer circumference frame 30 are integrally molded in this embodiment as shown in the drawing.

The bridging rib 40 preferably comprises a reinforcing structure for ensuring desirable rigidity as shown in FIGS. 5A and 5B. The flat portion 41 of the bridging rib is allowed to contact the foamed resin base member 20 to horizontally extend so as to connect between respective points on the outer circumference frame 30 are integrally molded in this embodiment as shown in the drawing.

The bridging rib 40 preferably comprises a reinforcing structure for ensuring desirable rigidity as shown in FIGS. 5A and 5B. The flat portion 41 of the bridging rib is allowed to contact the foamed resin base member 20 to receive the pressure acting during injection molding or press molding on a wide area. Since the load is dispersed, no stripes appear on the surface of the article along the ribs 40, thereby enabling good appearance of the article to be maintained.

The bridging rib 40 is formed into a reversed T shape comprising a flat portion 41 that makes contact with the foamed resin base member 20 with a thick rib portion 40a as shown in FIG. 5A, or into a shape having a L-shaped cross section with a flat portion 41b that can ensure a large contact area.

Mounting seats 42 for mounting functional members, such as an inside handle escussion 11, a power window switch finisher 12, a speaker grill 13 and a pocket escussion 14 may be integrally molded with the bridging ribs 40, when the vertically and horizontally extending bridging ribs 40 are molded as shown in FIG. 4.

In FIG. 4, the reference numeral 42a denotes a mounting seat for the inside handle escussion 11, the reference numeral 42b denotes a mounting seat for the power window switch finisher 12, the reference numeral 42c denotes a mounting seat for the speaker grill 13, and the reference numeral 42d denotes a mounting seat for the pocket escussion 14. The mounting seat 42b for the power window switch finisher 12 is preferably formed into a plate shape for improving the feeling of the surface of the article.

A clip seat 43 for mounting a clip 51 attached to the automobile body panel 50 may be integrally molded at the reverse side of the bridging ribs 40 as shown in FIG. 6, or the clip seat 43 may be provided so as to be elongated from the outer circumference frame 30 toward the inside as shown in FIG. 7.

One embodiment for manufacturing the automobile door trim 10 will be described hereinafter with reference to FIGS. 8 to 10. The die 60 to be used for molding the door trim 10 mainly comprises an upper die 61 capable of ascending and descending with a given stroke, a stationary side lower die 62 paired with the upper die 61, and an injector 63 communicating with the lower die 62.

In more detail, a cavity 611 that fits the shape of an article is formed in the upper die 61, which ascends and descends with a given strike by a hoist cylinder 612 connected to the upper face of the upper die 61. Guide bushes 613 that serve as a guide mechanism are provided at four corners of the upper die 61.

A core 621 corresponding to the cavity 611 of the upper die 61 is provided in the lower die 62. A manifold 622 and gate 623 are provided for feeding a molten resin to the molding face of the core 621, and the molten resin M is fed onto the upper face of the core 621 from an injector 63 through the passageways in the manifold 622 and gate 623.

Guide posts 624 that serve as a guide mechanism are projected at four corners of the lower die 62. The press position of the upper die 61 is properly maintained by guiding the guide posts 624 into the respective guide bushes 613 when the upper and lower dies are closed each other.

In the first step for molding the door trim 10, the foamed resin sheet S as a starting material of the foamed resin base member 20 is set between the upper and lower dies 61 and 62 while they are in open positions with each other. A polypropylene foamed sheet (trade name Sumiceller foamed PP sheet, foaming ratio=3, thickness 2 mm; made by Sumitomo Chemical Industries Co., Inc.) is used as the foamed resin sheet in this embodiment, and the foamed resin sheet S is supplied into the upper and lower dies 61 and 62 after a heat softening treatment at 130° C. with a heater 64 as shown in FIG. 9.

After supplying the foamed resin sheet S between the upper and lower dies 61 and 62, the upper die 61 is descended with a given stroke by operating the hoist cylinder 612 down to a lower dead point of the upper die 61. Subsequently, the molten resin M is fed into the gap between the closed upper and lower dies 61 and 62 from the injector 63 through the manifold 622 and gate 623 to mold each molded resin for the outer circumference frame 30 and bridging ribs 40, and for the respective mounting seats 42a to 42d of various functional members 11 to 14 if necessary, of the door trim 10.

The molten resin M utilizes Sumitomo Norblene AX568 (made by Sumitomo Chemical Industries Co., Inc., melt index=65 g/10 min) with an appropriate proportion of talc blended therein.

The foamed resin sheet S is molded following the shape of the cavity 611 under the upper die 61 formed by closing the upper and lower dies 61 and 62. The outer circumference frame 30 and bridging ribs 40, and mounting seats 42a to 42d if necessary, are integrally laminated on the inner face side of the foamed resin base member 20 by molding the foamed resin base member 20 into a desired shape.

The foamed resin base member 20, outer circumference frame 30 and bridging ribs 40 can be molded in one step as hitherto described. In particular, since only a limited amount of the molten resin M enough for molding the outer circumference frame 30 and bridging rib 40, and the mounting seats 42c to 42d of the functional members 11 to 14 if necessary, is supplied, the amount of the molten resin used may be reduced as compared with the conventional door trim made of a resin core material. In addition, the load imposed on the upper and lower dies 61 and 62 may be reduced while enabling the capacity of the injector 63 small or making the injector 63 to be small size. When a surface skin is required to be laminated on the surface of the foamed resin base member 20 in the specification, a master roll of the surface skin may be previously laminated on one face of the foamed resin sheet S.

The molten resin M may be formed into a desired shape by injecting it into the closed upper and lower dies 61 and 62 after softening the foamed resin sheet as by heating with the heater 64 for molding the foamed resin sheet S into the foamed resin base member 20. However, the foamed resin base member 20 may be molded in vacuum by applying a negative pressure from an evacuation mechanism in communication with the upper die 61 before closing the upper and lower dies 61 and 62, or simultaneously with clamping them, when a complex shape with a high extension ratio is required for the door trim.

The upper die may be regulated in two steps. The foamed resin sheet S is press-molded by closing the upper and lower dies 61 and 62 in the first step as a primary molding (pre-molding) of the foamed resin base member 20. Subsequently, the upper die 61 is allowed to ascend followed by allowing the upper die 61 to descend again, during which the molten resin M is injected into the cavity on the preformed foaming resin base 20 which has been pre-molded in the second molding step, thereby integrally molding the outer circumference frame 30 and bridging ribs 40, and mounting seats 42a to 42d for the functional members if necessary. The pre-heating step of the foamed resin sheet S may be omitted for the foamed resin base member 20 to be used for a laminate structure having a simple shape such as a jack lid, and the foamed resin base member 20 may be directly molded following the simple shape of the upper and lower dies 61 and 62.

The molten resin M is injected into the cavity from the injector 63 through the manifold 622 and gate 623 after closing the upper and lower dies 61 and 62 with each other in the molding method described above. However, a stamping mold method may be employed, wherein the molten resin M is previously fed into the cavity from the injector 63 at a timing before the upper mold 61 arrives at its lower dead point, and the molten resin is filled in the cavity for the article by a compression pressure generated when the upper die 61 has arrived at the lower dead point. Employing the stamping mold method is advantageous for providing many plate members 41 on the bridging ribs 40.

While the door trim 10 and the method for manufacturing the same have been described in the method for manufacturing the laminated structure according to the present invention, this method may be applied for the articles other than the door trim, for example for the trunk side trim 70 and trunk rear trim 71 as shown in FIGS. 11A and 11B.

The trunk side trim 70 and trunk rear trim 71 also comprise the foamed resin base member 20, outer circumference frame 30 following the outer circumference of the article, and bridging ribs 40. However, the bridging ribs 40 may be omitted in the trunk side trim 70 and trunk rear side trim 71 having a relatively simple shape, since the shape of the article may be maintained only by the shape retaining foamed resin base member 20 and outer circumference frame 30.

The lightweight foamed resin base member 20 is used, the resin core is omitted, and the outer circumference frame 30 and the bridging ribs 40, if necessary, are constructed of a molded synthetic resin to enable the articles to be lightweight and low cost. Furthermore, it is advantageous that gaps may be reliably prevented from being formed at the junction between the trunk side trim 70 and trunk rear trim 71 by allowing rigid outer circumference frames thereof to abut with each other as shown in FIG. 11B.

Small number of gaps are also formed at the joint between interior members, for example the joggle joint between the laminated structures 80 and 81 as shown in FIG. 12A and planar joint between the laminated structures 82 and 83 as shown in FIG. 12B, by taking advantage of high rigidity of the outer circumference frame 30, thereby enabling good external appearance of the joints to be obtained.

Figure 13:
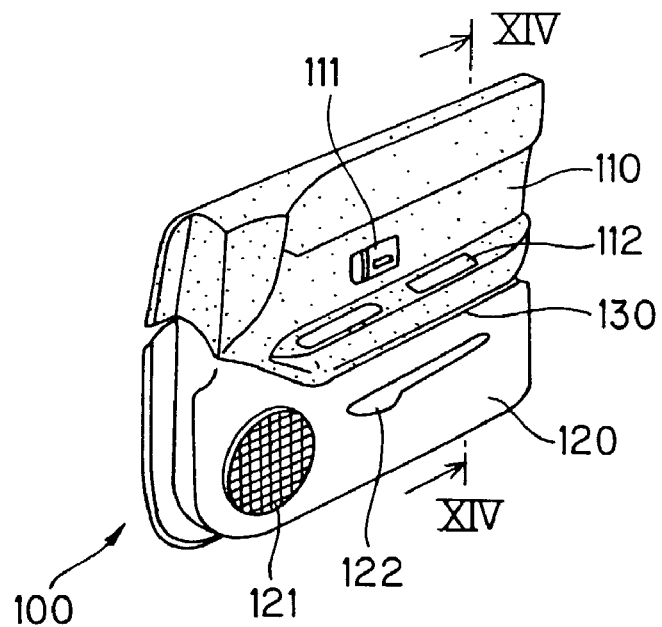
FIG. 13 shows a perspective view of the two-tone type door trim obtained by applying the laminated structure according to the present invention.
Figure 14:
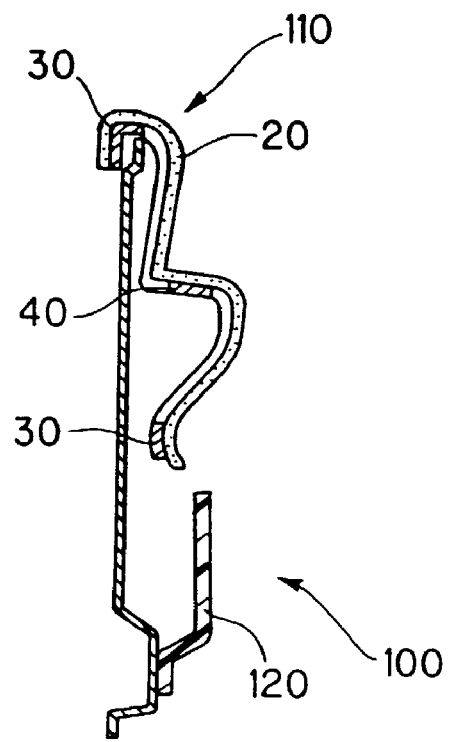
FIG. 14 shows a cross section along the line XIV-XIV in FIG. 13.

The second embodiment of the present invention will be described hereinafter with reference to FIGS. 13 to 18. FIGS. 13 and 14 show a two-tone type automobile door trim 100 to which the laminated structure according to the present invention is applied. The door trim 100 has different external appearances between the upper door trim 110 and lower door trim 120 with a boundary line 130 therebetween.

The construction of the laminated structure according to the present invention is applied for the upper door trim 110, which is composed of a molded synthetic resin comprising a foamed resin base member 20, an outer circumference frame 30 formed at the reverse side of the foamed resin base member 20 so as to conform the outer circumference of an article, and bridging ribs 40 connecting between respective points on the outer circumference frame 30. These members are integrally molded with each other.

The construction of the door trim 10 in the first embodiment is also applied for the upper door trim 110, which retains its shape with light weight and low cost while enabling an improved sound absorbing ability to be expected.

The lower door trim 120 is an injection molding member of a synthetic resin, wherein colorants are mixed for a good appearance of the surface of the door trim 100, a speaker grill 121 and pocket 122 are open on the door trim, a groove is formed along the boundary line 130 between the upper door trim 110 and lower door trim 120 for improving the appearance of the boundary, and the terminal of the foamed resin base member 20 is embedded in the groove for enhancing the appearance of the junction.

Figure 15:
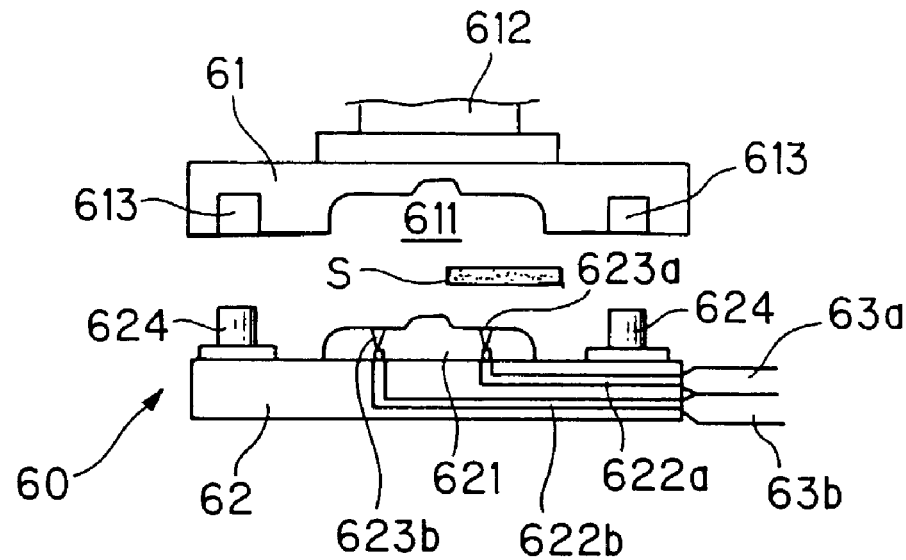
FIG. 15 illustrates a step for setting the foamed resin sheet in the method for manufacturing the two-tone type door trim shown in FIG. 13.
Figure 16:
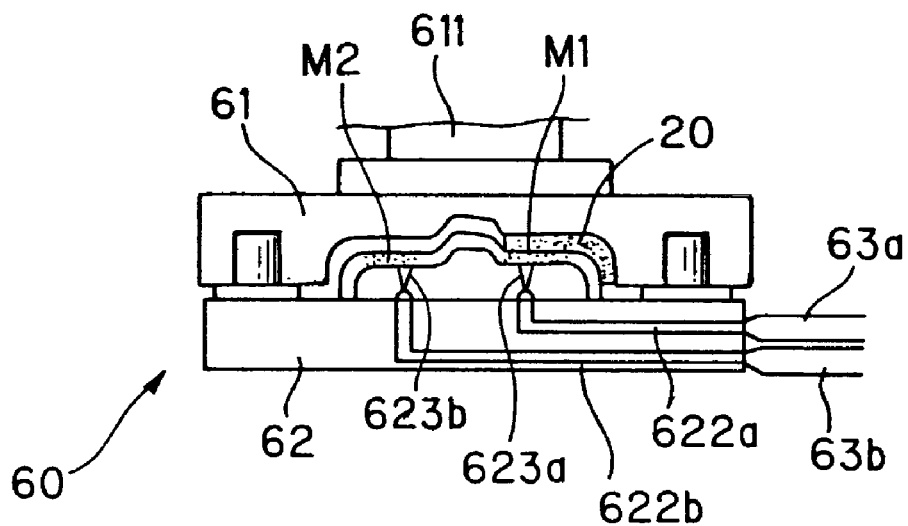
FIG. 16 illustrates a step for inject-molding the two-tone type door trim shown in FIG. 13.

One embodiment of the method for manufacturing the two-tone type door trim 100 will be described with reference to FIGS. 15 to 17. The die assembly 60 for molding the two-tone type door trim 100 comprises an upper die 61 and a lower die 62 with two injectors 63a and 63b connected to the lower die 62. Manifolds 622a and 622b, and gates 623a and 623b, corresponding to the two injectors 63a and 63b, respectively, are independently provided with each other as resin passageways for feeding molten resins M1 and M2 to the upper door trim 110 and lower door trim 120, respectively. The other constructions are omitted herein, since the constructions of the die assembly 60 in FIG. 8 may be also applied in this embodiment.

The method for manufacturing the two-tone type door trim 100 will be described hereinafter. A foamed resin sheet (S) that is used as a starting material of the foamed resin base member 20 in the upper door trim 110, is set in the upper half of the cavity that is defined by the cavity 611 of the upper die 61 and the core 621 of the lower die 62. The foamed resin sheet S is softened by heating with a heater (not shown) in advance to setting in the die assembly.

After setting the foamed resin sheet (S), the upper die 61 is descended with a given stroke by operating the hoist cylinder 612 of the upper die 61, and the foamed resin sheet S is molded following a desired molding face by closing the upper and lower dies 61 and 62 to mold the foamed resin base member 20. Then, the molten resin M1 is injected into the cavity for the upper door trim 110 from the first injector 63a through the manifold 622a and gate 623a for molding the outer circumference frame 30 and bridging ribs 40 of the upper door trim 110.

Subsequently, the molten resin M2 is injected into an approximately lower part of the cavity from the second injector 63b through the manifold 622b and gate 623b to mold the lower door trim 120 into a predetermined shape.

Figure 17:
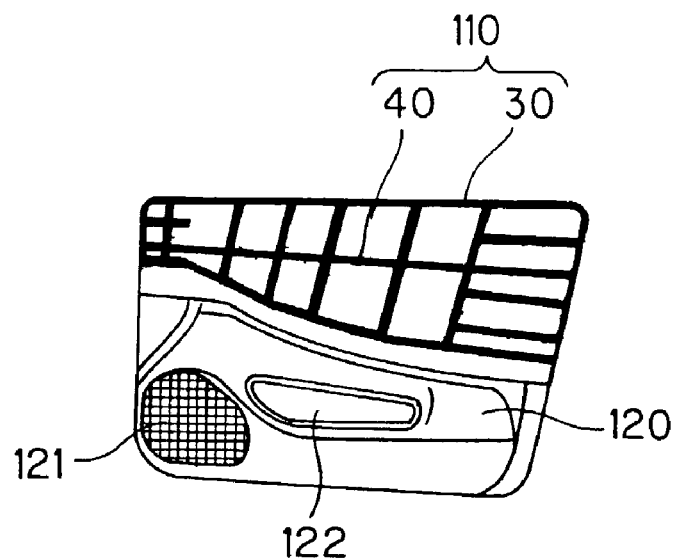
FIG. 17 is a plane view of the upper part of the two-tone type door trim shown in FIG. 13 when the foamed resin base member has been removed.

FIG. 17 shows the upper door trim 110 from which the foamed resin base member 20 has been removed. The outer circumference frame 30 and bridging ribs 40 in the upper door trim 110 are formed into a predetermined shape, and the lower door trim 120 is integrally molded with the upper door trim, by injecting the molten resins M1 and M2 from the first and second injectors 63a and 63b, respectively, into the cavity.

Two injectors 63a and 63b in communication with the lower die 62 are used for manufacturing the two-tone type door trim 100. The molten resins M1 and M2 for molding the upper door trim 110 and lower door trim 120, respectively, are injected through corresponding resin passage ways. Consequently, the two-tone type door trim 100 can be manufactured using one pair of the die assembly 60 with reduced number of manufacturing steps.

The material for the outer circumference frame 30 and bridging ribs 40 in the upper door trim 110 may be different from the material for the lower door trim. The materials may be appropriately changed depending on the items required for the upper and lower door trims.

Figure 18:
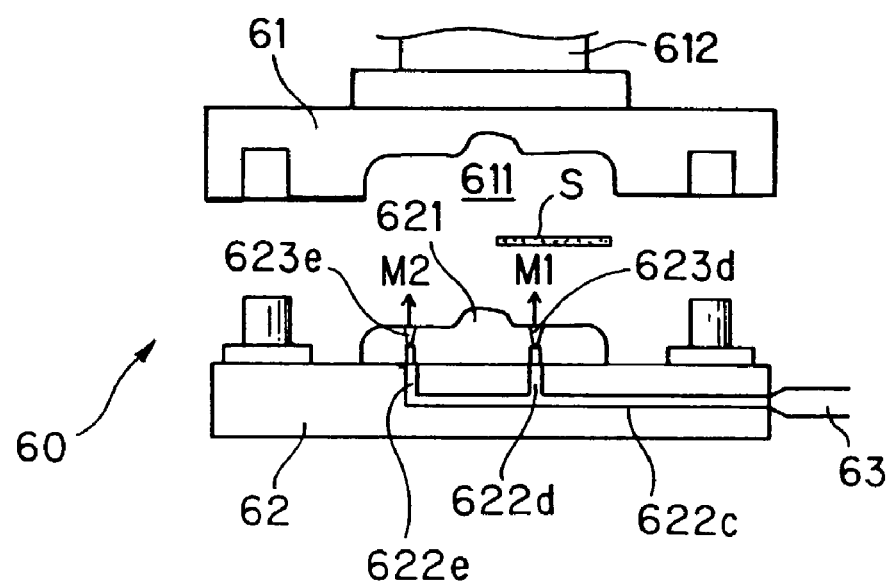
FIG. 18 illustrates another aspect of the method for manufacturing the two-tone type door trim shown in FIG. 13.
Figure 19:
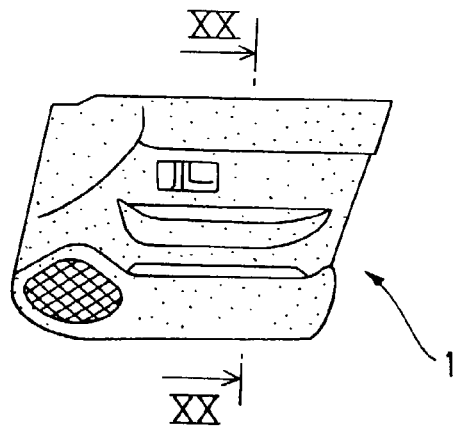
FIG. 19 is a front view of the conventional door trim.
Figure 20:
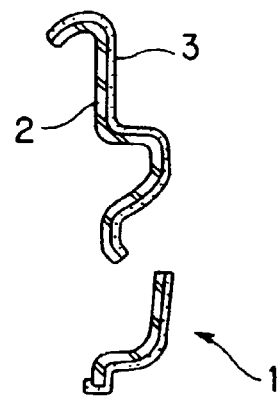
FIG. 20 shows a cross section along the line XX-XX in FIG. 19.
Figure 21:
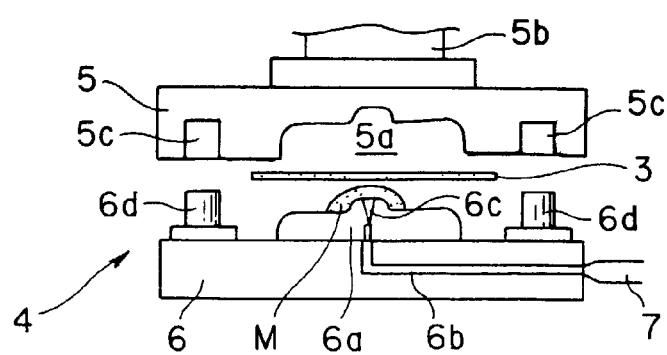
FIG. 21 is a schematic diagram showing the method for manufacturing the conventional door trim.

As shown in FIG. 18, the molten resins M1 and M2 may be fed from one injector 63 through one passageway having branches for the upper door trim 110 and lower door trim 120, respectively.

Shunt manifolds 622d and 622e are branched from a main manifold 622c in communication with the injector 63. Gates 623d and 623e are independently provided for each shunt manifold, and a switching valve is provided at each branching point. The timing for feeding the molten resin M1 to the upper door trim 110 from the injector 63 may be shifted from the timing for feeding the molten resin M2 to the lower door trim 120 in order to integrally mold the upper door trim 110 and lower door trim 120.

Accordingly, two injectors 63a and 63b may be replaced with one injector 63 as shown in FIG. 18 to simplify the construction of the molding system, although the timings for feeding the molten resins M1 and M2 should be shifted with each other.

The laminated structure according to the present invention comprises a lightweight and shape-retaining foamed resin base member, an outer circumference frame integrally laminated on the reverse side of the foamed resin base member at the sites where rigidity is required such as the peripheral edges of an article, and bridging ribs, if necessary, as hitherto described. Accordingly, the present invention provides a lightweight laminated structure with low cost that has an excellent sound absorbing ability die to its porous structure.

The foamed resin base member is formed into a desired shape by allowing the resin to conform the shape of the cavity in the die, while the outer circumference frame and bridging ribs are simultaneously molded on the reverse side of the foamed resin base member. As a result, the load imposed on the die assembly is reduced as compared with the article using a resin core, since the outer circumference frame and bridging ribs as molded resins have small projection areas. Moreover, the cooling time of the molded resin is shortened with high production yield, thereby enabling work efficiency to be enhanced and the production costs to be much reduced.

What is claimed is:

1. A laminated structure for a vehicle interior component comprising:
   a vehicle interior component base member comprising a sheet of shape-retaining foamed resin molded into a predetermined shape having a continuous peripheral edge, a first side having a central area, and a second side suitable for use as an automobile interior; and
   an outer circumferential frame, said outer circumferential frame configured to reinforce rigidly and comprising a molded synthetic resin assembly, integrally laminated on the first side of the base member along only a portion of the continuous peripheral edge,
   wherein the peripheral edge is shaped and configured to connect without gaps to body panels and other adjacent components.

2. The laminated structure according to claim 1, further comprising bridging ribs integrally laminated to the first side of the base member and connecting between respective points on the outer circumferential frame across the central area of the base member.

3. The laminated structure according to claim 2, wherein the bridging ribs have a cross sectional shape configured to reinforce rigidly, the bridging ribs including a flat portion in flat contact with the first side of the base member.

4. The laminated structure according to claim 2, wherein a thickness of the bridging ribs corresponds respectively to the strength of the external force expected to be applied to an article formed using the laminated structure.

5. The laminated structure according to claim 2, wherein at least one mounting seat for mounting a functional member to the laminated structure is integrally molded with the outer circumferential frame or with the bridging ribs.

6. The laminated structure according to claim 1 or claim 2, wherein a surface skin is integrally laminated on a second surface of the base member.

7. The laminated structure according to claim 1 or claim 2, further comprising a molded synthetic resin assembly attached to said laminated structure so as to be integrally molded with the outer circumferential frame of the laminated structure.

8. The laminated structure according to claim 2, further comprising mountings supported on the bridging ribs for attaching automobile interior features to the laminated structure.

9. The laminated structure according to claim 1, wherein said laminated structure comprises an automotive door panel.

10. The laminated structure according to claim 1, wherein said sheet of shape-retaining foamed resin comprises a thermoplastic resin and a foaming agent added therein.

11. The laminated structure according to claim 1, wherein said sheet of shape-retaining foamed resin comprises a polypropylene based resin and sodium bicarbonate added therein.

12. The laminated structure according to claim 1, wherein said outer circumferential frame comprises a polypropylene based resin.

13. The laminated structure according to claim 1, wherein said outer circumferential frame comprises a polypropylene based resin and said sheet of shape-retaining foamed resin comprises a polypropylene based resin and sodium bicarbonate added therein.

14. A vehicle interior laminated structure comprising:
   a vehicle interior shape-retaining base member molded into a predetermined shape from a foamed resin sheet and having a continuous peripheral edge, a first side having a central area, and a mutually-complementary second side; and
   a circumferential frame configured to reinforce rigidly and comprising an injection-molded synthetic resin integrally laminated on the first side of the base member along only a portion of the continuous peripheral edge.

15. A vehicle interior component, comprising:
   a vehicle interior component base member comprising a sheet of shape-retaining foamed resin molded into a predetermined shape having a peripheral edge and a first side having a central area;
   a frame configured to reinforce rigidly and comprising a molded synthetic resin assembly, integrally laminated on the first side of the base member along at least a portion of the peripheral edge, wherein said frame has an opening corresponding to said central area of said first side of said sheet of shape-retaining foamed resin; and
   at least one rib integrally laminated to the central area of said first side of the base member.

* * * * *